United States Patent Office 3,005,856
Patented Oct. 24, 1961

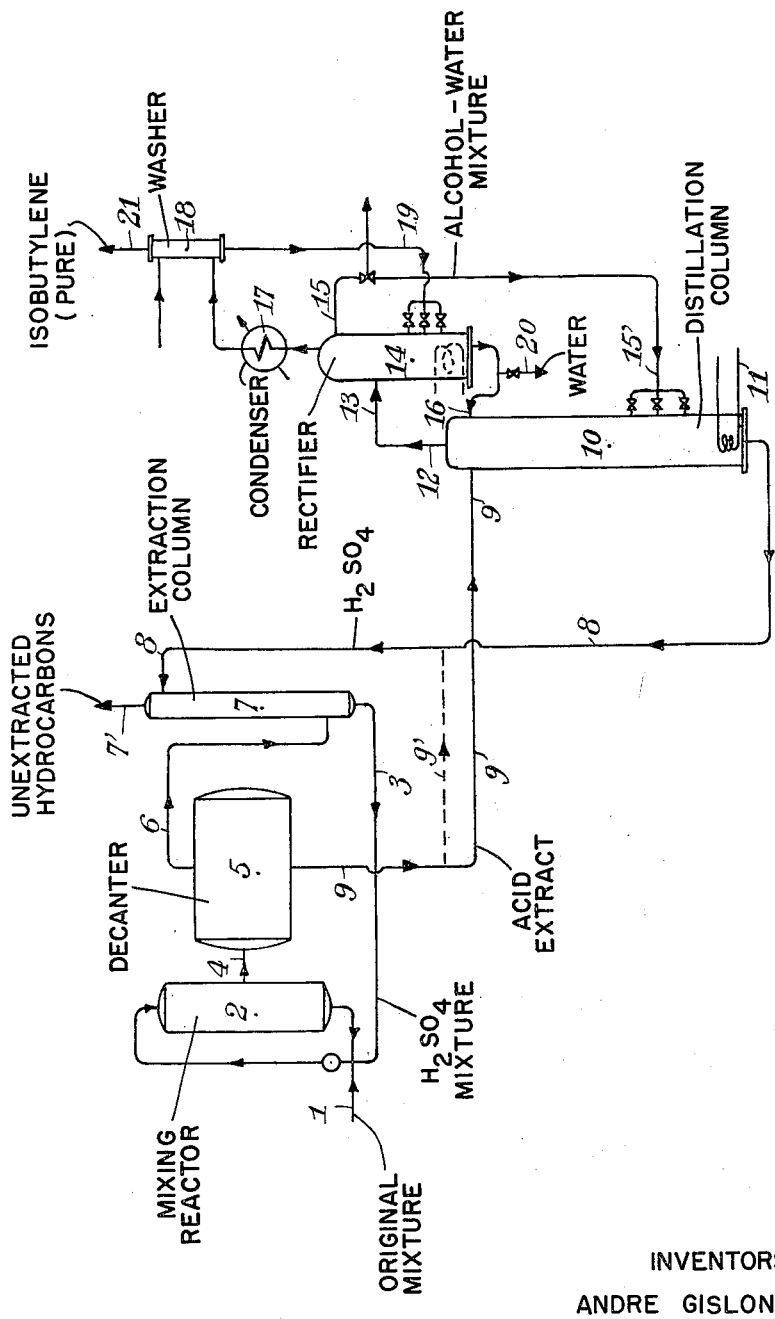

3,005,856
PROCESS FOR THE SEPARATION OF ISOBUTYL-ENE FROM MIXTURES OF HYDROCARBONS
André Gislon, Paris, André Valet, Gonfreville l'Orcher, and Jean Jacques Bellec, Le Havre, France, assignors to Compagnie Francaise de Raffinage, Paris, France, a corporation of the French Republic
Filed Apr. 19, 1957, Ser. No. 654,039
Claims priority, application France Aug. 14, 1956
4 Claims. (Cl. 260—677)

The present invention relates to the separation of olefins from a mixture of saturated and olefinic hydrocarbons in the liquid or gaseous state. It relates more particularly to the separation of pure isobutylene from a mixture of saturated hydrocarbons, having mainly four carbon atoms per molecule.

It is well known that olefinic hydrocarbons can be prepared by extracting the olefin contained in a recoverable quantity in a mixture of hydrocarbons, by means of a concentrated acid solution, then recovering absorbed olefinic hydrocarbon by diluting the acid extract of the alcohol or ester corresponding to the said olefin, then heating or distilling the said dilute extract, thus releasing the olefin. The acid solution then has to be reconcentrated before being returned to the extraction phase; moreover, processes of this type frequently necessitate the addition to said acid solution of so-called "antifoaming" compounds, and indeed purification or even frequent renewal of the said solution.

It is also well known that pure alcohols of low molecular weight, from two to six carbon atoms for example, such as ethanol, secondary propanol, secondary and tertiary butanol, the various pentanols, etc. can be prepared by selective extraction of the corresponding olefinic hydrocarbons contained in recoverable quantities in a mixture of hydrocarbons, by means of a moderately concentrated acid solution, followed by direct distillation of the said alcohol in the form of its azeotropic mixture with water. The French Patents No. 932,638 of the 23rd of August 1956 and No. 1,013,313 of the 27th of February 1950, in the name of the present applicants, are representative of this technique.

On the other hand, the known techniques do not permit a high yield of isobutylene, of a high degree of purity, to be recovered directly, starting with acid extracts of the corresponding alcohol or ester, without first diluting said acid extract with water before heating and/or distillation.

The present invention consists of a technique which obtains these results, thus differentiating it from the above-mentioned processes. It consists in obtaining pure isobutylene, contained in a mixture of hydrocarbons, by selective extraction of the said olefin by means of an aqueous solution of moderately concentrated sulphuric acid, then direct separation of the tertiary butyl alcohol thus formed, by heating the said acid extract in the upper portion of a distillation column, followed by reintroduction of the said alcohol into the central or lower portion of the said column, the tertiary butyl alcohol being thus completely dehydrated by counter-current contact with the sulphuric acid, and releasing pure isobutylene.

In a preferred but non-limiting method of carrying it out, the invention is characterised in that the solution used for extracting the olefin is an aqueous solution of sulphuric acid, the acid concentration of which is of the same order as that used for the preparation of the tertiary butyl alcohol by extraction of the isobutylene, that is to say of the order of 50% by weight and always less than 55%.

The applicants have found that the selection of such a concentration of the said acid solution has the following advantages:

(1) As indicated above, it permits the selective extraction of the isobutylene contained in a mixture of saturated olefinic hydrocarbons, having mainly four carbon atoms per molecule;

(2) It prevents any formation of polymers in the course of the extraction phase of the olefin;

(3) It enables the said extraction to be carried out at a temperature higher than room temperature, and which may be as high as 45° C., thus increasing the speed of absorption of the said olefin in the acid solution without harming the selectivity of the operation and without the formation of polymers, as indicated above;

(4) It permits the direct separation from the said acid extract of a non-contaminated solution of sulphuric acid as well as tertiary butyl alcohol and the consequent obtainment of isobutylene of a very high degree of purity, higher than 99%. The solution of sulphuric acid can be re-used a very great number of times without having to be subjected to any purification; and this without having first to dilute the said acid extract with water, which operation has the disadvantage of subsequently necessitating the reconcentration of the acid then obtained to its initial concentration for use in the extraction phase. This is, of course, contrary to the processes in which solutions of concentrated sulphuric acid, and more particularly concentration of the order of 60% or more by weight of acid, are used for extraction of the olefin.

Various modes of operation and certain operational improvements of the present invention will be explained in the course of the following description.

The extraction of the isobutylene contained in a mixture of hydrocarbons is carried out in practice by any known technique, for example in accordance with the process illustrated in the accompanying diagram.

A liquid mixture of butanes, n-butenes and isobutenes, originating from a petroleum distillation fraction or from any other source, and containing isobutylene, is introduced at 1 and intimately mixed, at a temperature of ≦45° C. in a reactor 2, with a solution of sulphuric acid which is introduced at 3. The solution has an acid concentration of the order of 50% by weight, and always less than 55% by weight, and already contains at least 5% by weight of absorbed isobutylene. The mixture of acid extract and hydrocarbons is passed through 4, into the decanter 5. The upper hydrocarbon layer, still containing a small amount of isobutylene not previously extracted by the acid solution, is extracted at 6 and introduced at the bottom of an extraction column 7 in which the said hydrocarbons are brought into contact, at room temperature and in counter-current flow, with a solution of sulphuric acid with an acid concentration of order of 50% by weight, and always less than 55% by weight, introduced at 8 at the top of the column 7, and to which, if necessary, there has previously been added, at 9′, a small amount of acid extract, withdrawn at 9 from the decanter 5.

Having extracted the rest of the isobutylene contained in the mixture of hydrocarbons, the acid solution is withdrawn at 3 and passed into the reactor 1 where it is brought into contact with a fresh charge of hydrocarbons containing a recoverable amount of isobutylene. The hydrocarbons which have not reacted are evacuated at 7′.

If the extraction effected in the reactor 1 was such that a hydrocarbon phase containing considerable amounts of isobutylene was withdrawn at 6, the said hydrocarbons may then be passed into a second reactor, identical with 1, and brought into contact, at room temperature or at a temperature lower than 45° C. with, for example, the acid solution extracted at 3 or any other solution of sulphuric acid with an acid concentration of the order of 50% by weight and always less than 55% by weight; this is so that only hydrocarbons containing small amounts of isobutylene will be passed through 6 into the column 7.

The applicants have found that the process for the extraction of isobutylene by means of a solution of moderately concentrated sulphuric acid should preferably be carried out in such a manner that the acid extracts of the alcohol or ester corresponding to the said olefin, obtained by any process, for example by the technique described above, have a molar ratio hydrocarbon absorb/sulphuric acid of the order of 0.3 to 1 and preferably 0.6 to 0.9.

Such an acid extract, separated from the hydrocarbons which have not reacted in the decanter 5, is withdrawn at 9; it is then ready, after expansion at atmospheric pressure, to be sent to the phase in which pure isobutylene is recovered.

According to the present invention, the recovery of pure isobutylene, starting with the said acid extract, is effected in the following manner:

The acid extract, in which the molar ratio hydrocarbon absorbed/sulphuric acid is of the order of 0.3 to 1.0, is introduced at 9 into the upper portion or in the vicinity of the top of a distillation column 10, which is heated in the base by means of a coil 11.

The alcoholic vapors distilled at 12 are introduced at 13 into the central or upper portion of a small rectifying column 14, from which the azeotropic mixture of tertiary butyl alcohol and water is extracted at 15. At the base of the said column, water is withdrawn at 20, and a certain fraction of this, corresponding to the excess of water contained in the alcoholic vapors distilled at 12 in relation to that for the formation of the azeotropic mixture of tertiary butyl alcohol and water, is reintroduced at 16 at the top of the column 10. The azeotropic mixture of tertiary butyl alcohol and water extracted at 15, is reintroduced at 15' into the central or lower portion of the column 10. The tertiary butyl alcohol is then dehydrated completely to form pure isobutylene by contact in counter-current flow with the solution of hot sulphuric acid travelling down the column 10 after separation, at the top of the said column, of the alcohol contained in the acid extract introduced at 9.

The pure gaseous isobutylene is extracted at 21 after passing through the condenser 17. If necessary, the isobutylene may be subjected to washing in water in an intermediate column 18, in order to eliminate any traces of tertiary butyl alcohol which may have been entrained. The mixture of water and tertiary butyl alcohol, withdrawn at the base of the column 18, may then be introduced at 19 into the central or lower portion of the column 14. As before, the azeotropic mixture of tertiary butyl alcohol and water will be extracted at 15, while the excess water is withdrawn at 20, at the base of the column 14. The pure isobutylene is extracted at 21.

It will be seen that the recovery process which has just been described actually enables the azeotropic mixture of tertiary butyl alcohol and water to be obtained, which mixture may be withdrawn at 15 through the valve indicated in the pipe 15, and the product withdrawn at 21 is pure isobutylene.

The applicants have found that, for the preparation of pure isobutylene, it would be possible to simplify the plant described with reference to the accompanying drawing, by omitting the small column 14. The vapors distilled at 12, which contain a slight excess of water in relation to the water necessary to form the azeotropic mixture of tertiary butyl alcohol and water, could actually be re-cycled directly into the central or lower portion of the column 10.

The process described above has great flexibility in practice and does not require strict supervision of the various operating conditions. In fact, as mentioned above, the selection of the concentration of the absorption acid enables isobutylene of a very high degree of purity to be obtained easily, with a very high yield, without the risk of the formation of polymers or third compounds. Nevertheless, the applicants have found that the following operational conditions are preferable, though without being limiting.

1 to 3 volumes of an aqueous solution of sulphuric acid containing 50% by weight of $H_2SO_4$ are introduced into the reactor 2 at the same time as a volume of a mixture of liquid hydrocarbons consisting of butanes, n-butenes and isobutylenes corresponding to 1 volume of isobutylene. The temperature of the reactor is maintained between 20° and 50° C., and preferably at 45° C.; the pressure inside the said reactor, which is a function of the temperature and of the mixture of hydrocarbons treated, is higher than atmospheric pressure and of the order of 5 to 7 kg./cm.$^2$.

The acid extract obtained on emerging from the dehydration phase and containing 0.6 to 0.9 of a molecule of absorbed olefin per molecule of sulphuric acid, is then introduced, at atmospheric pressure, into the column 10, at 9, at a temperature of between 60° and 100° C., and preferably at 80° C.: heating of the acid extract to a temperature above 100° C. would cause the formation of polymers. The temperatures in the column 10 are distributed as follows:

|  | ° C. |
|---|---|
| Temperature at the base (solution of sulphuric acid at 50% by weight) | 126 to 128 |
| Temperature at the top of the column (at 12) | 70 to 80 |

The rate at which the acid extract is fed to the column 10 is a function, on the one hand of the volume and capacity of the said column, and on the other hand of the molar ratio absorbed olefin/$H_2SO_4$ of the said extract. This rate, which is of the order of 0.05 cms./s. should, in practice, be maintained in such a manner that the acid extract introduced at 9 can never revert to a liquid phase inside the column, which would cause congestion of the latter to a greater or lesser extent. Such a congestion would, in fact, cause the formation of a certain amount of polymers and of third compounds, the concentration of which could reach several percent.

In the column 14, the temperatures are distributed in the following manner:

|  | ° C. |
|---|---|
| Temperature at the base (water) | 100 |
| Temperature at the top (at 15) | 70–80 |

The applicants have found that the amount of heat introduced at 13, with the alcoholic vapors, is such that it is practically unnecessary to supply any heat to the said column in order to effect a quantitative separation of the azeotropic mixture of tertiary butyl alcohol and water, at 15, and of the excess water.

Moreover, the applicants have found that the said azeotropic mixture should be recycled at 15' into the column 10 at such a point that the temperature of the column is of the order of 90° to 100° C., and preferably in the vicinity of and lower than 100° C.

The following discussion of the different operating variables will illustrate the part played thereby and will show the full importance of details and of the values of the operational conditions defined herein, having regard to the yields of the process for obtaining pure isobutylene by extraction of the said olefin by means of sulphuric acid solutions.

Table 1, below, shows the effect of the acid concentration of the aqueous solution of sulphuric acid on the selectivity of the process.

It is particularly clear from this that with a sulphuric acid solution at 50% by weight, the selectivity of the operation may be considered as excellent, and it may be estimated that the amounts of 1-butene and 2-butenes absorbed are extremely small, or even nil.

*Table I*

| Operation number | Concentration, $H_2SO_4$, percent | Temperature, °C. (extraction) | Analysis of the gases recovered ||||
|---|---|---|---|---|---|---|
| | | | Isobutylene | 1 butene | 2 butene (cis) | 2 butene (trans) |
| 1 | 50 | 25 | 99.7 | Indeterminable. | Indeterminable. | Indeterminable. |
| 2 | 50 | 35 | 99.7 | ...do | ...do | Do. |
| 3 | 50 | 50 | 99.5 | ...do | ...do | Do. |
| 4 | 65 | 25 | 95.9 | ...do | 1.5 | 2.3. |
| 5 | 65 | 25 | 95.9 | ...do | 1.7 | 2.1. |

The precision of the analyses of the gases recovered is ±0.1% (infra-red spectrography).

It is important to remember how much advantage there is in obtaining isobutylene of a high degree of purity directly, so as to avoid any subsequent purification of the isobutylene obtained; actually, the chemical compositions and the very close boiling temperatures of the n-butenes and of isobutylene render their separation very difficult and would necessitate very large distillation columns, for example.

Table II shows the effect of the acid concentration of the aqueous solution of sulphuric acid on the formation of polymers in the course of the process.

*Table II*

| Operation number | Concentration, $H_2SO_4$, percent | Extraction |||  Absorbed olefin, $H_2SO_4$ | Polymers, percent |
|---|---|---|---|---|---|---|
| | | Temperature, °C. | Vol. H.C./vol. acid sol. | Contact time, minutes | | |
| 1 | 50 | 25 | 5.0 | 58 | 0.75 | 0.13 |
| 2 | 50 | 25 | 8.0 | 55 | 1.00 | 0.17 |
| 3 | 50 | 25 | 9.7 | 42 | 0.90 | 0.10 |
| 4 | 50 | 25 | 6.3 | 45 | 0.70 | 0.06 |
| 5 | 50 | 25 | 8.0 | 45 | 0.86 | 0.06 |
| 6 | 65 | 23 | 6.6 | 35 | 0.92 | 1.20 |
| 7 | 65 | 23 | 10.0 | 34 | 1.30 | 2.50 |

"Polymers" are understood to mean the percentages by weight in relation to the weight of isobutylene present in the mixture of hydrocarbons introduced at 1.

Table III shows the influence of temperature on the formation of polymers, when the acid extraction solution is brought into contact with the hydrocarbons containing the isobutylene to be extracted. The similarity between the values in this table and those given above, both in Table II and in Table I easily shows the advantage of working with a moderately concentrated acid solution.

*Table III*

| Operation number | Concentration, $H_2SO_4$, percent | Extraction ||| Absorbed olefin, $H_2SO_4$ | Polymers, percent |
|---|---|---|---|---|---|---|
| | | Temperature, °C. | Vol. H.C./vol. acid sol. | Contact time, minutes | | |
| 1 | 50 | 25 | 2.5 | 76 | 0.51 | 0.2 |
| 2 | 50 | 25 | 2.6 | 50 | 0.46 | 0.1 |
| 3 | 50 | 25 | 2.5 | 44 | 0.40 | 0.15 |
| 4 | 50 | 35 | 2.6 | 76 | 0.51 | 0.3 |
| 5 | 50 | 35 | 2.4 | 43 | 0.44 | 0.28 |
| 6 | 50 | 35 | 2.4 | 54 | 0.46 | 0.4 |
| 7 | 50 | 46 | 2.7 | 33 | 0.45 | [1] 1.0 |

[1] Polymers which are mostly soluble in the hydrocarbon phase and do not pass into the sulphuric acid solution (50% by weight).

Table IV, drawn up for a mixture of hydrocarbons in which the isobutylene concentration is of the order of 20% by volume, shows the effect of the ratio of the volume of hydrocarbons to that of the aqueous solution of acid, introduced into the absorption phase of the isobutylene, on the rate of transformation of the isobutylene. It will be found—as mentioned above—that the rate of transformation for one extraction stage, is at its maximum when between 1 and 3 volumes of acid solution are introduced per volume of isobutylene.

*Table IV*

| Operation number | Volume H.C./vol. acid sol. | Concentration, $H_2SO_4$, percent | Temperature, °C. | Rate of feed, cm./s. | Rate of transformation percent |
|---|---|---|---|---|---|
| 1 | 8.5 | 50 | 25 | 0.03 | 55.5 |
| 2 | 6.3 | 50 | 24 | 0.03 | 59.5 |
| 3 | 5.0 | 50 | 27 | 0.03 | 64.5 |
| 4 | 2.5 | 50 | 25 | 0.03 | 72.5 |

Tables V and Vb, drawn up for two given columns of different height and internal section, relate to the effect of the molar ratio absorbed olefin/sulphuric acid of the extracts on the yield of the regeneration phase. These tables show that the capacity of the columns varies as a function of the said molar ratio of the extracts which are introduced therein, and that the number of isobutylene molecules regenerated per hour passes through a maximum for each of the columns.

*Table V*

| Mol absorbed olefin/sulphuric acid | 0.07 | 0.15 | 0.30 | 0.45 | 0.60 | 0.80 | 1.00 | 1.30 |
|---|---|---|---|---|---|---|---|---|
| Moles isobutylene regenerated per hour | 3.0 | 4.7 | 6.2 | 5.9 | 5.3 | 4.3 | 3.5 | 2.4 |

*Table Vb*

| Mol absorbed olefin/sulphuric acid | 0.3 | 0.6 | 0.8 | 1.0 | 1.3 | 1.5 |
|---|---|---|---|---|---|---|
| Moles isobutylene regenerated per hour | 7.5 | 12.5 | 13.5 | 13.3 | 11.0 | 8.0 |

The object of Table VI is to compare the results obtained, on the one hand by the process which is characteristic of the invention—which consists in recycling the azeotropic mixture of tertiary butyl alcohol and water into the central or lower portion of the distillation column which has served to obtain the said azeotropic mixture starting with the corresponding acid extract—and on the other hand, by a process consisting in regenerating the isobutylene directly, starting with the said acid extract, without distillation, then recirculation of the said azeotropic mixture, by modifying the operating conditions for the said column.

*Table VI*

| Mol absorbed olefin/sulphuric acid | 0.3 | 0.6 | 0.8 | 1.0 | 1.5 |
|---|---|---|---|---|---|
| Mols of isobutylene regenerated [1]: | | | | | |
| (a) Without recycling | 7.5 | 10.0 | 10.5 | 10.0 | 4.5 |
| (b) With recycling | 7.5 | 12.5 | 13.5 | 13.3 | 8.0 |
| Increase in the production of isobutylene, b/a, percent | 0 | 25 | 28.5 | 33 | 78 |

[1] Values obtained for a given column (Table Vb).

As shown in Table I, the isobutylene obtained by the process forming the subject of the present invention is of a very high degree of purity, higher than 99.5%; in particular, it does not contain any determinable trace of 1-butene or of the cis and trans isomers of 2-butene. As indicated above, in the event of traces of tertiary butyl alcohol being entrained, simple washing with water would be sufficient to obtain finally a product entirely free of any impurity.

The moderately concentrated aqueous solution of sulphuric acid, used in carrying out the present process may, as already mentioned, be recycled a very large number of times. Indeed, the applicants have found, for example, that the amount of acid solution used to extract the isobutylene contained in 140 times the amount of a mixture of hydrocarbons, in the course of 500 operational cycles, showed no appreciable modification in its coloring, no reduction in its power to hydrate the said olefin, and no trace of decomposition products such as various tars or sulphurous anhydride. Analysis of the said amount of aqueous solution of sulphuric acid, the initial acid concentration of which was 50% by weight, produced the following results:

$H_2SO_4$—49.25%
Ashes—2.44%
$H_2O$ (sufficient amount for 100%)

The ashes proved to be metal salts originating from the corrosion of the various plants by the sulphuric acid.

We claim:

1. In a process for the selective separation and concentration of isobutylene from a mixture of saturated and unsaturated hydrocarbons, the steps which comprise converting isobutylene in said mixture into tertiary butyl alcohol by absorption with sulphuric acid at a concentration of no more than about 55% producing an extract having a molar ratio of absorbed hydrocarbons to sulphuric acid within the range of about 0.3 to 1, separating said tertiary butyl alcohol from said acid extract by distillation at a temperature less than that at which polymerization of components of said extract occurs and substantially without dilution of said extract, dehydrating said separated alcohol by countercurrent flow contact with sulphuric acid from said distillation to convert said alcohol into isobutylene, withdrawing said isobutylene from said countercurrent flow dehydration, and recycling said sulphuric acid for further conversion of additional isobutylene in said hydrocarbon mixture.

2. In a process for the selective separation and concentration of isobutylene from a mixture of saturated and unsaturated hydrocarbons, the steps which comprise absorbing isobutylene from said mixture into a solution of sulphuric acid at a concentration of no more than about 55% for the transformation of said isobutylene into tertiary butyl alcohol, separating tertiary butyl alcohol thus formed from the acid extract fraction of said absorbing step substantially without dilution of said acid extract fraction by heating said fraction in the upper portion of a distillation column, introducing said separated tertiary butyl alcohol into a different lower portion of said column and dehydrating said alcohol to form isobutylene by contact in counter-current flow with said sulphuric acid solution in said column, and recycling said sulphuric acid solution withdrawn at the base of said column to said isobutylene absorbing step.

3. In a process for the selective separation and concentration of isobutylene from a mixture of saturated and unsaturated hydrocarbons including isobutylene and butene, the steps which comprise treating said mixture with a sulphuric acid solution comprising less than 55% by weight sulphuric acid at a temperature not exceeding about 45° C. for forming tertiary butyl alcohol from said isobutylene, separating said alcohol from the acid extract of said treating step substantially without dilution of said acid extract by heating said acid extract in the upper portion of a distillation column, introducing said separated alcohol into a different lower portion of said column and dehydrating said alcohol to form isobutylene by contact in countercurrent flow with portions of said sulphuric acid moving down said column, withdrawing said sulphuric acid from the base of said column after said treating and dehydrating steps, and recycling said withdrawn sulphuric acid for use in said first treating step.

4. In a process for the selective separation and concentration of isobutylene from a mixture of saturated and unsaturated hydrocarbons, the steps which comprise selectively extracting isobutylene from said mixture with sulphuric acid at a concentration of about 50% by weight and at a temperature of about 35° C. for converting said isobutylene to tertiary butyl alcohol in an acid extract fraction, separating said alcohol from said fraction substantially without dilution thereof by heating said fraction in the upper portion of a distillation column, re-introducing said separated alcohol into a different lower portion of said column and dehydrating said alcohol to isobutylene by contact with said sulphuric acid flowing down said column, withdrawing said sulphuric acid at the base of said column, and recycling said withdrawn sulphuric acid to said extracting step.

References Cited in the file of this patent

UNITED STATES PATENTS 2,012,785    Deanesly et al. _____ Aug. 27, 1935
2,093,426    Dreyfus _____ Sept. 21, 1937

OTHER REFERENCES

Noller: "Chemistry of Organic Compounds," W. B. Saunders Co., Philadelphia (1951), p. 127.